United States Patent [19]

Jones

[11] 4,437,014

[45] Mar. 13, 1984

[54] SMOKE DETECTION AND DISCONNECTION APPARATUS

[76] Inventor: Lawrence J. Jones, 60 Church St., R.D. #4, Box 3, Milford, N.J. 08848

[21] Appl. No.: 273,584

[22] Filed: Jun. 15, 1981

[51] Int. Cl.³ ............................................ G01N 15/06

[52] U.S. Cl. ..................................... 250/574; 356/439

[58] Field of Search ................ 250/574, 575; 340/628, 340/629, 630; 356/438, 439, 338

[56] References Cited

U.S. PATENT DOCUMENTS

| | | | |
|---|---|---|---|
| 3,313,946 | 4/1967 | Goodwin et al. | 340/630 |
| 3,376,425 | 4/1968 | Kraus et al. | 250/574 |
| 3,773,145 | 11/1973 | Drexler | 340/630 |
| 3,932,137 | 1/1976 | Culpepper | 356/439 |
| 4,065,759 | 12/1977 | Handing | 250/574 |

*Primary Examiner*—David C. Nelms

*Attorney, Agent, or Firm*—Michael W. York

[57] ABSTRACT

Smoke detection and disconnection apparatus that includes a housing having an inlet and an outlet for the passage of smoke and a smoke detection chamber located between the inlet and the outlet. The smoke detection chamber has radiation emitting and detecting equipment for the detection of smoke. An external air deflector or smoke concentrator is connected to the housing for increasing the sensitivity of the smoke detection and disconnection apparatus. The smoke detection and disconnection apparatus not only detects smoke but it also disconnects the electrical equipment that is causing the smoke to prevent further damage. In addition, an alarm is sounded to alert personnel that there is a potential fire hazard with respect to the electrical equipment.

20 Claims, 11 Drawing Figures

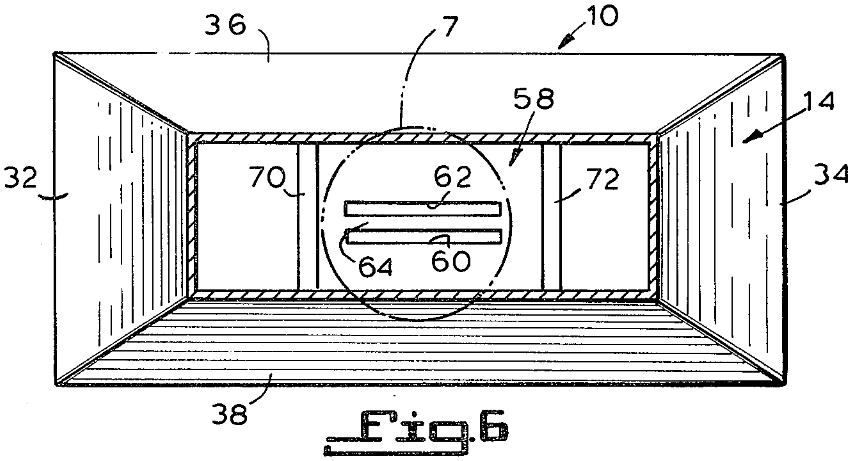
Fig. 6
Fig. 8
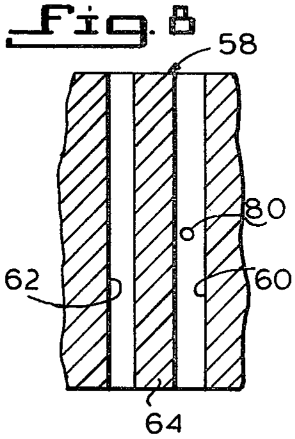
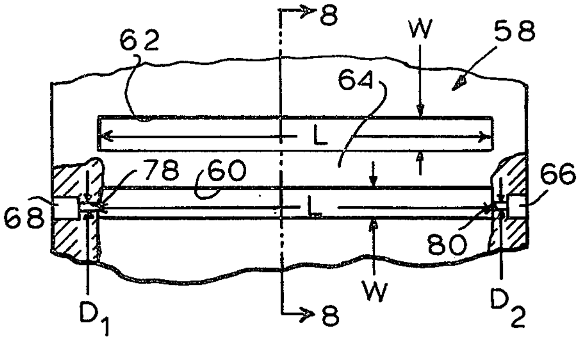
Fig. 7
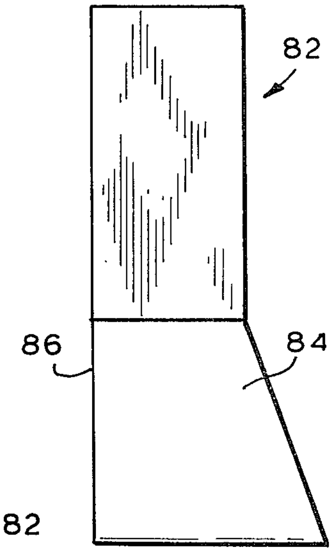
Fig. 9
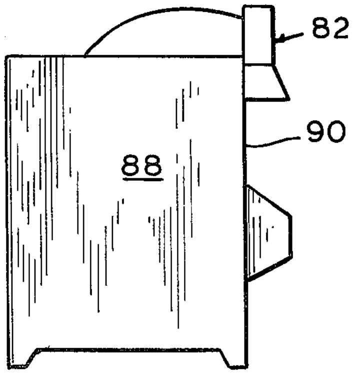
Fig. 10

SMOKE DETECTION AND DISCONNECTION APPARATUS

BACKGROUND OF THE INVENTION

The dangers associated with fire have been known for centuries in terms of their impact on property and lives. In view of these dangers many attempts have been made to reduce them by eliminating the source of the fire, providing early warning of the fire or by increasing the effectiveness of counteracting the fire.

Recently emphasis has been placed on early detection of the fire as being a very effective means of controlling or reducing the destructiveness of the fire. A typical example of this is the commonly known smoke detector. This commonly known smoke detector detects smoke and then usually sounds an alarm so that the occupants of the dwelling will then be informed that there is probably a fire in the dwelling. Unfortunately, such a smoke detector is usually only effective while there are people in the dwelling and only after a possible substantial amount of damage has been done to certain equipment as a result of the fire that emits the smoke that causes the smoke detector to sound the alarm.

Unfortunately, such measures may not detect the presence of fire early enough to prevent substantial damage to a structure or to human beings. In addition, in most instances, such measures would require the presence of some individual in close proximity to the alarm system in order to avoid further destruction to property or life.

The present invention overcomes the deficiencies inherent in previous systems by eliminating the need for the presence of an individual to take action upon receiving an alarm notice. In addition, the present invention is capable of detecting a dangerous fire prior to it evolving into a fire that destroys a material amount of equipment or threatens life. This is accomplished even though an individual may not be in the vicinity of the fire to take action upon receiving notice of the fire such as by an alarm from fire detection equipment.

SUMMARY OF THE INVENTION

This invention relates to smoke detection apparatus and more particularly to smoke detection apparatus that can readily prevent damage due to fire.

It is accordingly an object of the invention to provide smoke detection apparatus which is capable of detecting a prospective fire prior to the time any extensive damage is done.

It is also an object of the invention to provide smoke detection apparatus which also includes provisions for eliminating the potential source of a fire.

It is an object of the invention to provide smoke detection apparatus which includes means for shutting off the source of a potential fire.

It is an object of the present invention to provide smoke detection and disconnection apparatus which disconnects electrical equipment upon detection of smoke.

It is an object of the present invention to provide smoke detection and disconnection apparatus which does not require the presence of human beings to be effective against fire.

It is an object of the present invention to provide smoke detection and disconnection apparatus which is locatable near the electrical equipment which is most likely to be a fire hazard.

It is an object of the present invention to provide smoke detection and disconnection apparatus which concentrates the smoke which may emit from a possible fire hazard.

It is an object of the present invention to provide smoke detection and disconnection apparatus which concentrates smoke laden air but does not unduly impede the passage of such concentrated smoke laden air through the smoke detection and disconnection apparatus.

The present invention provides smoke detection and disconnection apparatus including a housing having an inlet aperture and an outlet aperture for the passage of smoke and a detection chamber located between the inlet and the outlet aperture of the housing and in fluid communication with the inlet and outlet apertures. Radiation means are also provided located in position to transmit a beam of radiation through at least a portion of the detection chamber located in the housing and radiation detection means are located in position to detect the beam of radiation transmitted through at least a portion of the detection chamber located in the housing. Smoke detection means is also provided which is connected to the radiation emitting means and the radiation detection means for causing operation of the radiation emitting means and for determining when the intensity of the radiation beam detected by the radiation detection means is reduced due to the presence of smoke in the smoke detection chamber and disconnecting means is provided which is connected to the smoke detection means and adapted to be connected to apparatus to be disconnected for disconnecting the apparatus when the smoke detection means determines that the intensity of the radiation beam detected by the radiation detection means is reduced due to the presence of smoke in the smoke detection chamber.

BRIEF DESCRIPTION OF THE INVENTION

The invention will be hereinafter more fully described with reference to the accompanying drawings in which:

FIG. 6 is a sectional view of the smoke detection and disconnection apparatus taken substantially on the line 6—6 of FIG. 1;

FIG. 7 is an enlarged view of a portion of the smoke detection and disconnection apparatus illustrated in FIG. 6 taken within the circle 7 thereof;

FIG. 8 is a sectional view of a portion of the smoke detection and disconnection apparatus taken substantially on the line 8—8 of FIG. 7;

FIG. 9 is a side elevational view of an additional embodiment of the smoke detection and disconnection apparatus;

FIG. 10 is a side elevational view of a television set illustrating how the additional embodiment of the smoke detection and disconnection apparatus is utilized.

DETAILED DESCRIPTION OF THE PREFERRED EMBODIMENTS

Figure 1:
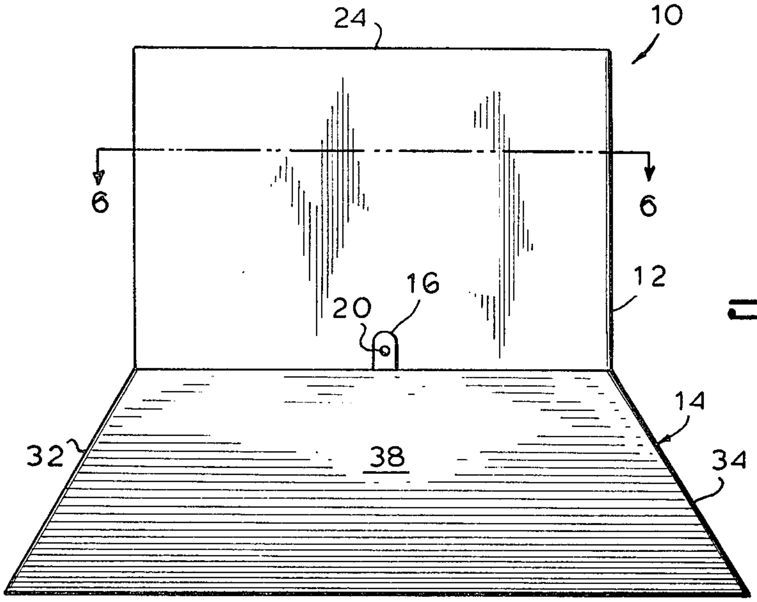
FIG. 1 is a front elevational view of the smoke detection and disconnection apparatus of the present invention.
Figure 2:
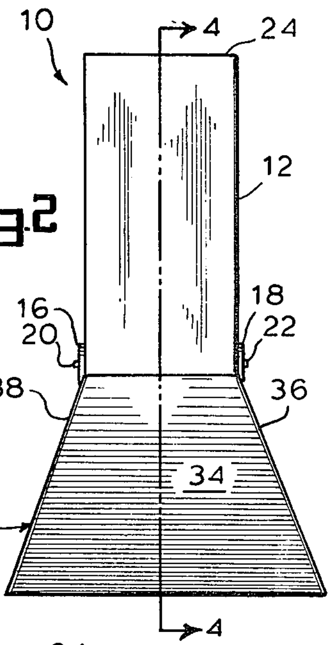
FIG. 2 is a side elevational view of the smoke detection and disconnection apparatus illustrated in FIG. 1.
Figure 3:
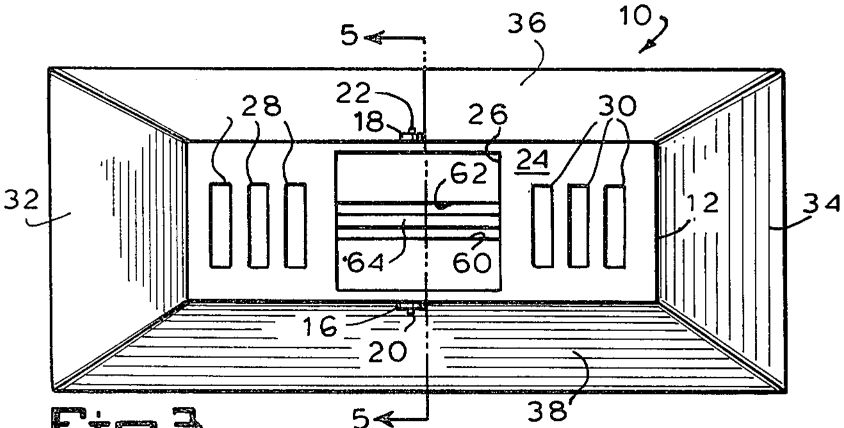
FIG. 3 is a top plan view of the smoke detection and disconnection apparatus illustrated in FIGS. 1 and 2.

Referring first to FIGS. 1 through 3, the smoke detection and disconnection apparatus is illustrated and is designated generally by the number 10. The smoke detection and disconnection apparatus 10 comprises a generally rectangular shaped housing 12 and an external air deflector 14 connected to the underside of the housing by the respective tabs 16 and 18 and the respective screws 20 and 22. As illustrated in FIG. 3, the substantially flat upper surface 24 of the housing 12 has a substantially centrally located generally rectangular aperture 26. The upper surface 24 also has a plurality of substantially rectangular shaped apertures 28 and 30 located on opposite sides of the aperture 24. The external air deflector 14 has end walls 32 and 34 that are angled inward toward the housing 12 and side walls 36 and 38 which are also angled inward toward the housing 12.

Figure 4:
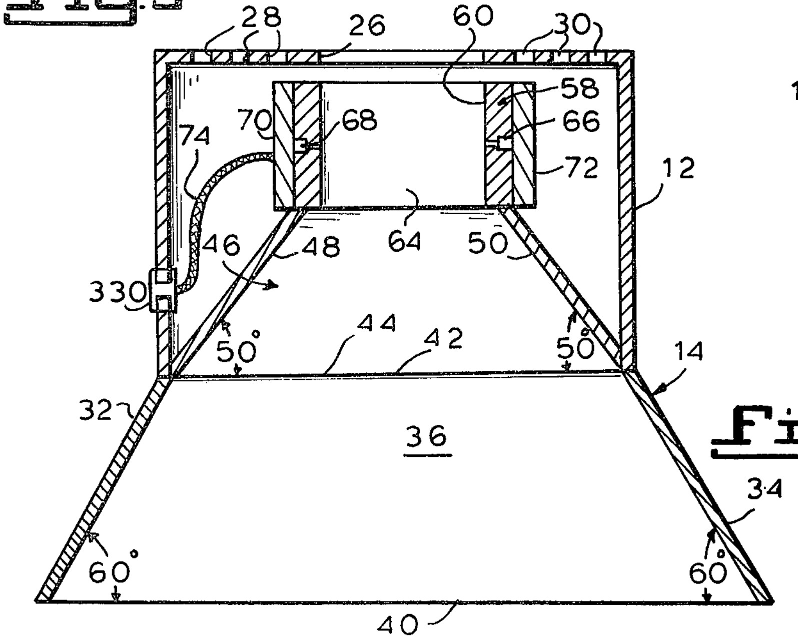
FIG. 4 is a sectional view of the smoke detection and disconnection apparatus taken substantially on the line 4—4 of FIG. 2.
Figure 5:
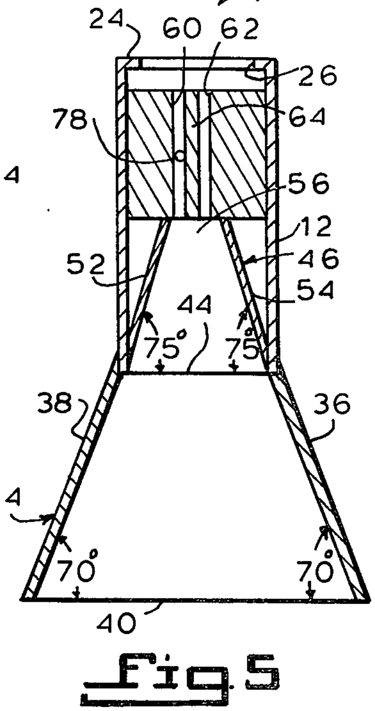
FIG. 5 is a sectional view of the smoke detection and disconnection apparatus taken substantially on the line 5—5 of FIG. 3.

FIGS. 4 and 5 illustrate portions of the interior of the smoke detection and disconnection apparatus 10. As illustrated in FIG. 4, the end walls 32 and 34 of the external air deflector 14 are angled upwardly toward the housing 12 at substantially a sixty degree angle with the lower edge 40 of the external air deflector 14. It will be noted that the upper open end portion 42 of the external air deflector 14 substantially coincides with and is connected to the lower edge portion 44 of an interior air deflector 46 which is located completely within the housing 12. The interior air deflector 46 has substantially flat end walls 48 and 50 which slope inwardly and upwardly at substantially an angle of fifty degrees with the lower edge 44 of the interior air deflector 46.

As illustrated in FIG. 5, the side walls 36 and 38 slope inwardly and upwardly at an angle of substantially seventy degrees with the lower edge 40 of the external air deflector 14. It should also be noted that the internal air deflector 46 has side walls 52 and 54 which slope inwardly and upwardly at substantially an angle of seventy-five degrees with the lower edge 44 of the interior air deflector 46. The lower end of the sides 52 and 54 of the interior air deflector 46 substantially coincide with the upper end portion of the respective sides 36 and 38 of the external air deflector 14.

It has been unexpectedly determined that these particular relationships result in a superior detector that has improved sensitivity and consequently it is important to have the fifty degree, sixty degree and seventy degree angular relationships that were previously described.

As illustrated in FIGS. 4 and 5, the upper end portion 56 of the inner air deflector 46 is connected to a smoke detection chamber member 58. The upper end portion 56 of the inner air deflector 46 is connected to the smoke detection chamber member 58 in such a manner that air passes from the interior of the air deflection member 46 into the adjacently located thin rectangular shaped air chambers 60 and 62. The air that passes through the air chambers 60 and 62 then exits from the housing 12 through a rectangular opening 26 and through the slots 28 and 30.

It will be noted that the chambers 60 and 62 are substantially identical and are separated from each other by a partition member 64. Smoke detection chamber member 58 has provisions for a photoemitter 68 and a photodetector 66. Photoemitter 68 is located in position to direct a beam lengthwise through the chamber 60 so that it impinges upon the photodetector 66. It has been unexpectedly determined that the use of the additional chamber 62 which does not have any associated photo emitter or photo detector such as that located in position with respect to the chamber 60 for some reason increases the sensitivity of the smoke detection and disconnection apparatus 10. It is suspected that this additional chamber 62 prevents air from stagnating in just the smoke detection chamber 60 and hence causes a more rapid detection of smoke build up in the surrounding air. The electronic equipment 90 associated with the photoemitter 68 and the photodetector 66 and other necessary electronic equipment for the smoke detection and disconnection apparatus is located in packages designated by the numbers 70 and 72 at the ends of the smoke detection chamber member 58. It will be noted that electrical conduit 74 extends from the electronic equipment package 70 to a plug 330 in the wall of the housing 12.

FIGS. 7 and 8 illustrate in greater detail the apparatus associated with the detection chamber 60 and the associated passage chamber 62. As illustrated, a circular aperture 78 is provided directly in front of the photoemitter 68, in order to provide a circular collimated beam of radiation that traverses at least a portion of the smoke detection chamber 60. The diameter D1 of the aperture 78 should be no more than substantially 1/16 of an inch. Also as illustrated, the width W of the smoke detection chamber which has a substantially rectangular cross section and is designated by the number 60 would be a maximum of substantially 3/16 of an inch. In addition, the length L of the detection chamber 60 should be a maximum of substantially one and one-half inches long. It will also be noted that the circular cross section aperture 80 is located directly in front of the photodetector 66. This circular cross section aperture 80 is a maximum diameter $D_2$ which is substantially equal to 1/16 of an inch. It should be noted that the adjacently located aperture or chamber 60 has substantially the same dimension, that is L and W as as the detection chamber 60.

FIG. 9 illustrates a side elevational view of an additional embodiment of the invention designated generally by the number 82. This additional embodiment of the invention 82 is identical in all respects to the previously and hereinafter described detection and disconnection apparatus 10 with the sole exception of the configuration of the external air deflector 84. This air deflector 84 is similar in all respects to the previously described external air deflector 14 with the sole exception that it has a flat back 86. This flat back 86 permits the smoke detection and disconnection apparatus 82 to be utilized in certain instances with equipment such as the television set 88 illustrated in FIG. 10. In this connection it will be noted that the smoke detection and disconnection apparatus is mounted on the back portion 90 of the television set 88 above the electrical portion of the set so as to readily detect smoke that might eminate from the television set 88.

Figure 11:
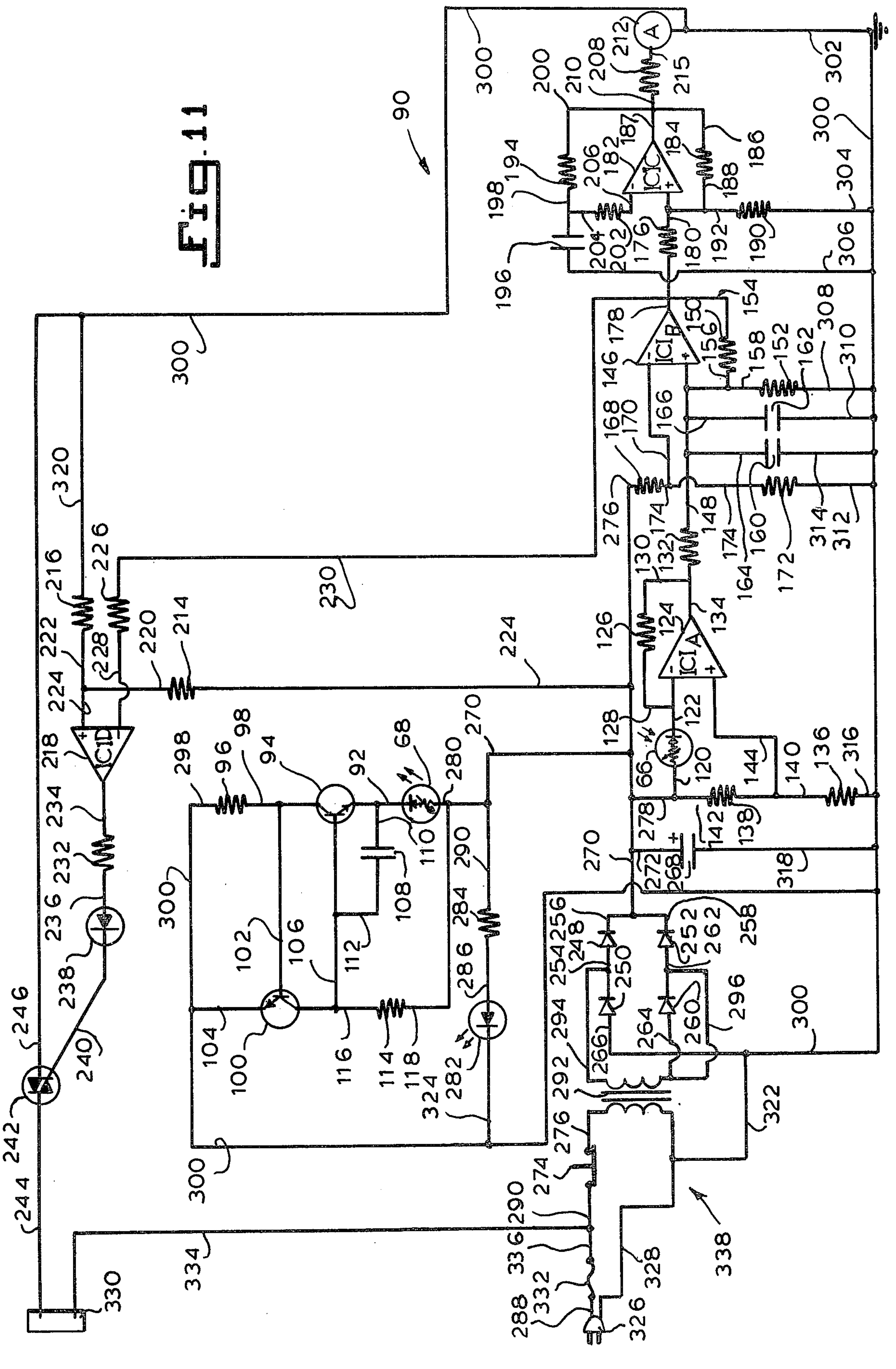
FIG. 11 is a circuit diagram of the electronic circuit of the smoke detection and disconnection apparatus.

The electronic circuit associated with the detection and disconnection apparatus 10 is illustrated in FIG. 11 and is designated generally by the number 90. The electronic circuit 90 includes the photoemitter 68 and the photodetector 66 which are infrared photoemitter and photodetectors which are readily available from Radio Shack, Number 276-142. Radio Shack is a division of Tandy Corporation with outlets throughout the United States. The photoemitter 68 is connected via the electrical conductor 92 to the constant current source of transistor 94 which is then connected to resistor 96 via electrical conductor 98 and to the transistor 100 via the electrical conductor 102 and to resistor 114 via electrical conductor 106 and resistor conductor 116. Capacitor 108 is connected to electrical conductor 106 via electrical conductor 112 and to the conductor 92 via the conductor 110. Transistor 100 is connected to transistor 94 and resistor 96 via electrical conductor 102. Electrical conductor 280 connects the photoemitter 68 to the d. c. positive voltage supply conductor 270. Resistor 114 is connected to the electrical conductor 270 via electrical conductor 118. Transistor 100 and resistor 96 are connected to the most negative and electrical ground conductor 300 via electrical conductors 104 and 298 respectively.

It will also be noted that a light emitting diode, LED 282 which can be a number 276-033 available from Radio Shack is connected to the electrical conductor 270 through the electrical conductor 286, the resistor 284 and the electrical conductor 290. LED 282 is then connected to the common electrical conductor 300 via the electrical conductor 324.

The photodetector 66 is connected via the electrical conductors 120 and 278 to the positive voltage conductor 270 and also to the first section 124 of a quad op amp. A quad op amp is the common name for a single package integrated circuit containing four independent operational amplifiers. This is a type 324 linear op amp available through many electronic parts suppliers. If supplied by Radio Shack it is designated by part number 276-1711. Electrical conductor 122 connects the photodetector 66 to op amp 124 and the conductors 122 and 128 connect the photodetector 66 to resistor 126 which is in turn connected via the electrical conductor 130 to the output conductor 134 of the op amp section 124. Resistor 138 is connected via electrical conductor 144 to op amp section ICI A 124. Resistor 138 is also connected to the resistor 136 via electrical conductor 140. The resistor 136 is also connected to the common electrical conductor 300 by the electrical conductor 316. Resistor 138 then is also connected to the joined electrical conductors 120 and 278 via the electrical conductor 142. The electrical conductor 278 is in turn connected to positive voltage electrical conductor 270. Resistor 132 is connected to op amp section, ICI A, 124 via electrical conductor 134. Resistor 132 also is connected to the resistor 126 via the electrical conductor 130.

Resistor 132 also is connected to the second section of the quad op amp, ICI B, 146 via electrical conductor 148. The electrical conductor 148 is also connected to the resistor 150 via electrical conductors 158 and 156, and the electrical conductor 158 is also connected to the resistor 152. The electrical conductor 148 is also connected to the capacitor 162 via electrical conductor 166 and the capacitor 160 via electrical conductor 164. The resistor 150 is connected to op amp section 146 output conductor 178 via the electrical conductor 154. The electrical conductor 178 is also connected to the resistor 226 via electrical conductor 230 and to the resistor 176. The resistor 168 is connected via the electrical conductor 174 to resistor 172. The electrical conductor 174 is connected to op amp 146 inverting input electrical conductor 170. Resistor 176 is connected to the third section ICI 182 of the quad op amp, operated as a pulse generator, via electrical conductor 180. In addition, the resistor 176 is connected to the resistors 184 and 190 via the respective electrical conductors 188 and 192 and the electrical conductor 180. Consequently, the resistor 176, the resistor 184 and the resistor 190 are connected to the ICI 182 non-inverting electrical conductor 180. Then the resistor 184 via respective electrical conductors 186, 210, 200 and 187 is connected to respective electronic components resistor 208, resistor 194, and the third section of the quad op amp ICI 182. Resistor 194 via electrical conductor 198 is also connected to capacitor 196 and the resistor 202 via electrical conductor 204. Resistor 202 is then connected to the inverting input of the third section ICI 182 of the quad op amp via the electrical conductor 206. The resistor 208 is then connected to a conventional solid state buzzer 212 via the electrical conductor 215. The solid state buzzer 212 is in turn connected to ground via the electrical conductor 302. Resistor 226 is connected to the output of op amp section 146 via electrical conductor 230 and to the fourth section 218 of the quad op amp operated in the d. c. mode to produce gate trigger current for triac 242, via electrical conductor 228. Resistor 214 via electrical conductor 224 is connected to d. c. positive supply electrical conductor 270. Resistor 214 is then connected to op amp section 218 non-inverting input, and resistor 216 via respective electrical conductors 220, 224 and 222. The output of op amp section 218 is connected via electrical conductor 234 to resistor 232 which is in turn connected to a type IN4001 diode 238 via electrical conductor 236. The diode 238 is in turn connected to a triac 242, a common electronic component used as a solid state switch, via the electrical conductor 240. The triac 242 is a six amp triac obtainable from the Radio Shack Division of the Tandy Corporation and designated by part number 276-1001. The triac 242 is then connected to the receptical 330 via electrical conductor 244, the triac is also connected to the ground electrical conductor 300 via electrical conductor 246. The respective resistors 172, 152, 190, 216 and capacitors 160, 162, 196 are also connected to device ground electrical conductor 300 by their respective electrical conductors 312, 308, 304, 320, 314, 310 and 306.

The d. c. power supply is generally designated by the number 338 and contains transformer 292 which is connected to diodes 248 and 250 by the electrical conductors 294 and 254 and to diodes 252 and 260 via electrical conductors 296 and 262. The electrical conductor 254 also connects diodes 248 and 250. Also the electrical conductor 262 connects diodes 252 and 260 together. Diodes 248 and 252 are connected to the positive supply electrical conductor 270 by their respective electrical conductors 256 and 258. Diodes 250 and 260 are also connected by their respective electrical conductors 266 and 264 which in turn connect to the common ground electrical conductor 300. Capacitor 268 is connected to positive supply conductor 270 via electrical conductor 272 and to ground conductor 300 via the electrical conductor 318. The transformer 292 is a commonly available transformer with a 117 v. a. c. source on the primary producing 9 volts on the secondary. The transformer low side is connected to the plug 326 neutral electrical conductor 328 which is connected to the plug 326 and ground electrical conductor 300 via electrical conductor 322. The high side of transformer 292 is then connected to the reset 274 via electrical conductor 276 and the reset 274 is connected to a fuse 332 via electrical conductors 290 and 336. The reset 274 is also connected to the socket 330 via the electrical conductors 290 and 334. The fuse 332 then is connected to the plug 326 via electrical conductor 288.

The values and other information related to the previously described components are set forth below:

| | Resistor | Ohmic Value |
|---|---|---|
| Resistor values | 96 | 51 ohms |
| are in ohms. | 232 | 110 ohms |
| K = 1,000 ohms | 126 | 1 M ohms |
| M = 1,000,000 ohms | 152 | 12 K ohms |
| All are ¼ watt | 114 | 2.7 K ohms |
| | 132 | 33 K ohms |
| | 168 | 15 K ohms |
| | 284 & 136 | 6.8 K ohms |
| | 138 & 172 & 208 | 1 K ohms |
| | 150 & 214 & 226 | 100 K ohms |
| | 176 & 190 | 470 K ohms |
| | 216 | 20 K ohms |
| | 184 | 10 M ohms |
| | 194 | 2.2 M ohms |
| | **Capacitor** | **Value** |
| Capacitors are | 286 | 1,000 μ.F. |
| in micro farads | 160 | 1 μ.F. |
| or as stated. | 108 | 500 P.F. |
| | 162 | 300 P.F. |
| Diodes 248, 250, 252, 260 and 238 are IN4001 general purpose rectifiers. | | |
| Triac 242 - 400 volt 6 amp triac | | |
| I.C.I. Linear op. amp. type LM 324 | | |

The smoke detection and disconnection apparatus 10 is used as follows. The smoke detection and disconnection apparatus is located in an appropriate location so that its air deflector would be in position to be exposed to smoke from a potential fire source such as electrical equipment. Since smoke generally rises, this position would normally be above such a fire source. The electrical receptical 330 in housing 12 of the smoke detection and disconnection apparatus 10 is then connected to the inlet plug or receptical of the electrical equipment or the like (not shown) that is to be disconnected in the event it emits smoke. The receptical for such a piece of electrical equipment is represented by the number 330 in FIGS. 4 and 11 and the connecting cord extending from the plug 326 to the receptical 330 is represented by electrical conductors 334 and 244. The plug 326 has been omitted in FIG. 4 for clarity.

The electrical plug 326 (FIG. 11) of the smoke detection and disconnection apparatus 10 is then connected to a suitable 117 volt a. c. source which results in the energizing of the electronic circuit 90 of the smoke detection and disconnection apparatus 10. High sensitivity of the smoke detection and disconnection apparatus 10 is in part due to the requirement that the space inside the external air deflector 14 be at least six times that of the smoke chamber 62 area. The narrow smoke detection chamber 62 in conjunction with configuration of the external air deflector 14 concentrates the smoke, if any, and this results in the partial or total early interruption of the beam from the photoemitter 68 to the photodetector 66.

Without smoke the photodetector 66 will exhibit a low resistance. This being the case, a higher positive voltage would be set up at the inverting input of the op emp section 124 than at the non-inverting input of the same section 124 that is received through the voltage divider network comprised of resistors 138 and 136. Since the inverting input is the ruling factor in this instance, the output of the op amp section 124 would be an inversion of the input. This result would be zero volts or no voltage output. With no output from op amp section 124 there would be through resistor 132 practically zero volts passed on to the non-inverting input of op amp section 146. At this time there would be zero output from the same section 146 because of the overriding positive voltage on the inverting input of this section 146 set up by the voltage divider comprised of resistors 168 and 172. With no positive input to the non-inverting input of section 182 from op amp section 146 through resistor 176 op amp section 182 cannot produce an output. With no output from op amp section 182 the alarm device, the solid state buzzer 212, will be silent. It will be noted that at the same time zero volts are passed on to the inverting op amp section 218 through resistor 226 and hence the positive voltage at the non-inverting input of the same section 218 through resistor 214 controls the operation of the op amp section 218. When this occurs the output from op amp section 218 will be a high positive, practically d. c. supply voltage. Triac 242 can be controlled from an on to an off conducting state by applying or not applying a gate current. With a positive voltage at the gate terminal of triac 242 felt through diode 238 and resistor 232 from op amp section 218 there would be a gate current through the triac 242 to ground electrical conductor 300 via electrical conductor 246. Resistor 232 limits this current to a safe value to protect the triac 242. With gate current present in the triac 242 the triac 242 acts basically as a closed switch. Therefore, 117 volts a. c. would be supplied at the socket 330 high side through the plug 326 and fuse 332 via electrical conductors 336 and 334. On the other side there is voltage from the socket 330 through the triac 242 (functioning effectively as a closed switch) via electrical conductors 246, 300, 322, 328 and back to the plug 326, providing the plug 326 is supplied with voltage.

Emission of the photoemitter 68 will be a constant brightness due to the constant current source of transistors 94 and 100. In operation current travels through the photoemitter 68 and series transistor 94 and resistor 96 to ground due to positive base bias felt on transistor 94 via electrical conductor 106 from resistor 114 that is connected to the positive supply line 270 via electrical conductor 118. Voltage felt on the base of transistor 94, or any n.p.n. transistor determines how much it will conduct. Current through resistor 96 sets base voltage for transistor 100 via electrical conductor 102. If the current through resistor 96 would tend to rise, the voltage on electrical conductor 102 would tend to rise due to the fact that voltage is equal to current times resistance in any electrical circuit. If the voltage on electrical conductor 102 would try to rise, then base voltage on transistor 100 would try to rise. If transistor 100's base voltage rose it would conduct more current, lowering its collector voltage and therefore passing a lower voltage on to transistor 94 via electrical conductor 106. With a lower base bias transistor 94 and the series resistor 96 would draw less current resulting in a constant current through the photoemitter 68, producing a constant brightly emitted light beam. Capacitor 108 connected across transistor 94 is used as a neutralizing capacitor to protect the circuit from self-oscillating and causing instability.

When total or partial interruption of emission between photoemitter 68 and photodetector 66 occurs by smoke passing through smoke detection chamber 60 the sensitive photodetector 66 would receive less light radiation. When the photodetector receives less light the photodetector 66 resistance to electrical current would increase resulting in a decrease in the voltage felt on the inverting input of op amp section 124. Section 124 of the op amp operated in the d. c. mode would be governed by a higher voltage on its non-inverting input via the voltage divider of resistors 136 and 138. With non-inverting input ruling, op amp section 124 produces a positive voltage output. This positive voltage is passed on to op amp section 146 operated in the d. c. mode via resistor 132. Output positive voltage from op amp section 124 at non-inverting input of section 146 would tend to over-ride inverting input set up on op amp section 146 via voltage divider resistors 168 and 172. However, there is a time delay applied via r. c. combination resistor 132 capacitor 160 and resistor 152 of approximately 0.03 seconds to protect against false alarms. After the time interval the positive voltage on the non-inverting input of the op amp section 146 would override the inverting input influence and produce a positive voltage output approaching d. c. supply level. It will be noted that feedback resistor 150 will then apply a positive voltage on op amp section 146 non-inverting input via voltage divider resistor 152 and this voltage will control the op amp section 146. The op amp section 146 will now be latched to the positive voltage output state until the circuit's electric current has been interrupted. Capacitor 162 is for electrical interference protection used as a bypass filter. Two things now happen. A positive voltage is passed to op amp section 182 via resistor 176. The op amp section 182 is connected as a pulse generator and voltage at the non-inverting input would produce a positive voltage output. This positive voltage output charges capacitor 196 through resistor 194. When this voltage reaches the value to over-ride the voltage on the non-inverting input of op amp section 182 felt from feedback and voltage divider resistors 184 and 190 the op amp section would go to the inverted state of no output until the voltage level of the inverting input discharged capacitor 196 falls below the voltage of non-inverting input caused by the divider resistors 176 and 190. The op amp section 182 would then revert to the high state and the cycle would repeat, providing a series of pulses whose repetition rate is determined by the values of the resistors 194, 184 and 190 and capacitor 196. Changing resistor 184 or capacitor 196 would particularly vary the frequency. With the values stated there are five pulses per second. These pulses are delivered to the solid state buzzer 212 via resistor 208. Upon receiving positive pulses the alarm 212 will oscilate at 4.7 khz. The alarm will be turned on and off five times per second producing attention getting sounds.

At the same time positive output voltage from op amp section 146 is sent to inverting input of op amp section 218 over-riding non-inverting of voltage divider resistors 214 and 216. As described earlier, the op amp section 218 would produce no output. With no output of the op amp section 218, there would be no gate current for triac 242. Triac 242 would then act as an open switch.

The action of the triac 242 acting as an open switch turns off the electrical equipment or the like and hence prevents fire and further damage from the smoking electrical equipment and sounds an audible alarm, in the previously indicated manner, to alert personnel that smoke has come from the electrical equipment being monitored.

After the electrical equipment that caused the smoke is repaired or replaced, the electronic circuit 90 of the detection and disconnection apparatus 10 can be reset by pushing the reset button 274. The pushing of this button or switch returns electricity to the receptical 330 by removing the latch voltage of the op amp section 146. The device 10 would then be reverted to its monitoring state as described earlier.

Although the invention has been described in considerable detail with reference to certain preferred embodiments it will be understood that variations or modifications may be made within the spirit and scope of the invention as defined in the appended claims.

What is claimed is:

1. Smoke detection and disconnection apparatus comprising a housing having an inlet aperture and an outlet aperture for the passage of smoke and a detection chamber member having a plurality of apertures located between the inlet aperture and the outlet aperture of said housing and in fluid communication therewith, radiation emitting means located in position to transmit a beam of radiation through at least a portion of the detection chamber member in said housing, radiation detection means located in position to detect the beam of radiation transmitted through at least a portion of the detection chamber member in said housing, said radiation emitting means being located to transmit a beam of radiation through only one of the apertures of said detection chamber member to cause said aperture to be a smoke detection chamber, smoke detection means connected to said radiation emitting means and said radiation detection means for causing the operation of said radiation emitting means and for determining when the intensity of the radiation beam detected by said radiation detection means is reduced due to the presence of smoke in the smoke detection chamber in said chamber member, smoke concentrating means for concentrating smoke located between the inlet of said housing and said detection chamber member, said smoke concentrating means having an inlet aperture and an outlet located adjacent to said detection chamber member with the cross sectional area of the inlet aperture being greater than the cross sectional area of the outlet, and disconnecting means connected to said smoke detection means and adapted to be connected to monitored electrical apparatus for turning off the electricity to said monitored electrical apparatus when said smoke detection means determines that the intensity of the radiation beam detected by said radiation detection means is reduced due to the presence of smoke in the smoke detection chamber in said detection chamber member.

2. The smoke detection and disconnection apparatus of claim 1 further comprising alarm means connected to said smoke detection means for providing an alarm when said smoke detection means determines that the intensity of the radiation beam detected by said radiation detection means is reduced due to the presence of smoke in the smoke detector chamber in said housing.

3. The smoke detection and disconnection apparatus of claim 2 further comprising means associated with said alarm means for protecting against false alarms.

4. The smoke detection and disconnection apparatus of claim 3 wherein said false alarm preventing means comprises a time delay circuit.

5. The smoke detection and disconnection apparatus of claim 2 wherein said alarm means comprises an audible alarm.

6. The smoke detection and disconnection apparatus of claim 5 wherein said alarm means comprises an oscilating alarm.

7. The smoke detection and disconnection apparatus of claim 6 wherein said oscillating alarm comprises a buzzer.

8. The smoke detection and disconnection apparatus of claim 1 wherein said smoke concentrating means comprises an interior air deflector.

9. The smoke detection and disconnection apparatus of claim 8 wherein said interior air deflector has substantially flat end and side walls that slope inwardly and upwardly.

10. The smoke detection and disconnection apparatus of claim 9 wherein the substantially flat end and side walls of the interior air deflector slope respectively at substantially an angle of fifty degrees and seventy-five degrees with the lower edge of the interior air deflector.

11. The smoke detection and disconnection apparatus of claim 8 wherein said housing has an underside and the inlet aperture is located in the underside and further comprising an external air deflector connected to the underside of said housing.

12. The smoke detection and disconnection apparatus of claim 11 wherein the space inside the external air deflector is at least six times the space in the detection chamber of said detection chamber member.

13. The smoke detection and disconnection apparatus of claim 12 wherein said exterior air deflector has substantially flat end and side walls that are angled inward toward said housing.

14. The smoke detection and disconnection apparatus of claim 13 wherein the end walls and the side walls of said external air deflector are angled upwardly toward said housing at respectively substantially sixty degrees and seventy degrees with the lower edge of said external air deflector.

15. The smoke detection and disconnection apparatus of claim 1 wherein the non-detection chamber apertures in said detection chamber member are substantially identical to said detection chamber.

16. The smoke detection and disconnection apparatus of claim 15 wherein the detection chamber has substantially a rectangular cross section.

17. The smoke detection and disconnection apparatus of claim 16 wherein the width of the detection chamber is a maximum of substantially 3/16 of an inch.

18. The smoke detection and disconnection apparatus of claim 17 wherein the length of the detection chamber is a maximum of substantially one and one-half inches.

19. The smoke detection and disconnection apparatus of claim 15 further comprising means located adjacent said radiation emitting means for providing a collimated beam of radiation.

20. The smoke detection and disconnection apparatus of claim 1 wherein said disconnecting means comprises an electronic circuit including a triac.

* * * * *